April 13, 1937.    P. D. MERRILL    2,077,050
PIPE LEAK PLUG
Filed Jan. 11, 1936
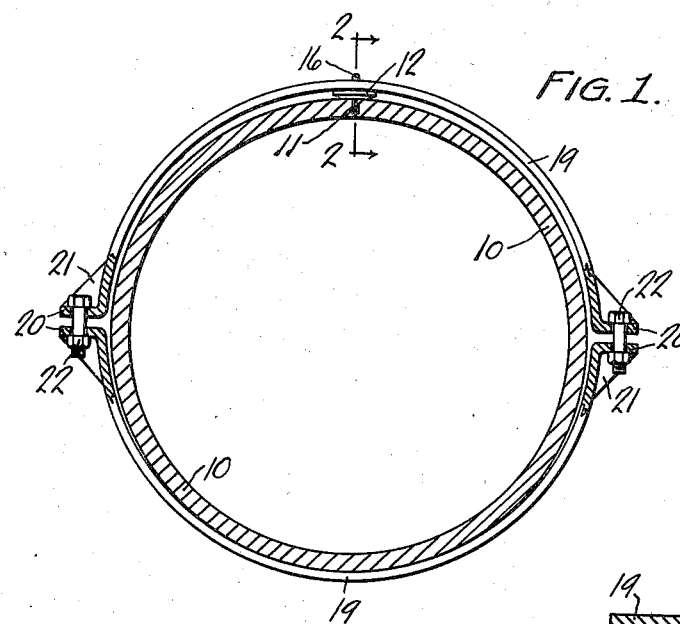
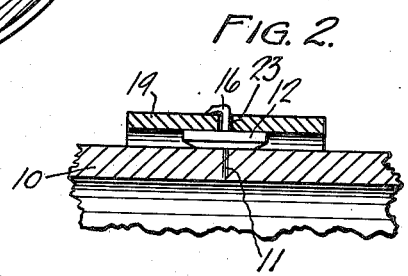
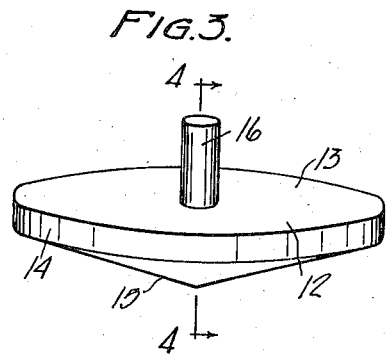
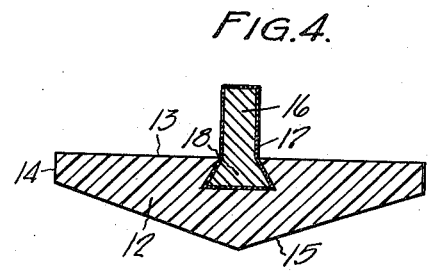
INVENTOR.
PATTERSON D. MERRILL.
BY Attech + Knoblock
ATTORNEYS.

Patented Apr. 13, 1937

2,077,050

UNITED STATES PATENT OFFICE 2,077,050

PIPE LEAK PLUG

Patterson D. Merrill, South Bend, Ind.

Application January 11, 1936, Serial No. 58,637

6 Claims. (Cl. 138—99)

This invention relates to improvements in pipe leak plugs, and particularly to plugs adapted to be pressed against and to stop leaks occuring in the plain portion of a pipe in spaced relation to a pipe joint. The leaks for which the plug is particularly adapted are of the "spot leak" or "pin leak" type wherein the body of the pipe is defective at only one small point or area thereof.

These leaks are generally stopped by applying thereagainst a rubber plug which is radially pressed and locked in sealing engagement with the pipe by a radially contractible split clamp. Considerable difficulty has heretofore been experienced in satisfactorily and effectively applying the plug to the leak, and in maintaining the plug in effective position while the clamp is being tightened to an extent sufficient to clamp the plug in place. This is especially the case where the pipe is conducting gas under high pressure, because the jet of gas escaping through the leak at high pressure tends to displace the plug before the clamp can be tightened sufficiently to lock the plug in place. Added to this consideration is the factor of size, the plugs being of comparatively small diameter and thickness, so that the operator cannot safely grip the plug until the clamp takes hold because of the small clearance between pipe and clamp. This latter factor becomes of increased importance where the clamp employed is of a width greatly exceeding the diameter or width of the plug.

It is therefore the primary object of this invention to provide a plug of this character with means by which it may be effectively held in predetermined relation to a pipe in a manner to overcome the deflecting action of a jet of fluid issuing under high pressure from a pipe leak.

A further object is to provide a plug of this character with simple and inexpensive means for locking it to a pipe clamp preparatory to application thereof to a leaking pipe.

A further object is to provide a plug of this character with a soft metal stud partially imbedded therein and projecting therefrom and through a clamp aperture to expose a portion thereof which may be bent into interlocking relation with the clamp.

A further object is to provide a plug of this character with a configured pipe engaging face and a partially imbedded metal member projecting from the side opposite said configured face and terminating in spaced relation to said face to accommodate reshaping of said face under pressure.

A further object is to provide a plug of this character formed of rubber and having imbedded therein one end of a lead member which is provided with a surface layer of a metal to which the rubber will firmly adhere.

Other objects will be apparent from the description and the appended claims.

In the drawing:—

Figure 1 is a transverse sectional view of a leaking pipe illustrating my new leak plug and the cooperating clamp in side elevation with parts of the clamp shown in section.

Figure 2 is a fragmentary longitudinal sectional view taken on line 2—2 of Fig. 1.

Figure 3 is a perspective view of my new pipe leak plug.

Figure 4 is a sectional view of the leak plug taken on line 4—4 of Fig. 3.

Referring to the drawing, which illustrates the preferred embodiment of the invention, the numeral 10 designates a pipe having a "spot leak" or like leak which is designated diagrammatically at 11.

To stop this leak I utilize a leak plug designated generally as 12 which is preferably formed of rubber which is sufficiently flexible to accommodate bending or reshaping, but which will not flow beyond practical limits when subjected to sealing pressure and substantially unconfined. The plug is of conventional form, and has a plane face 13, a circular periphery 14, and a slightly tapered or conical surface 15. A pin or stud 16, preferably formed of lead or other suitable soft and readily deformable metal, which is plated with a layer of brass 17 or other metal to which rubber will firmly adhere, is partially imbedded in plug 12 coaxially thereof to project centrally and perpendicularly to face 13. The imbedded end 18 of the stud 16 is preferably of enlarged tapering section, as illustrated in Fig. 4, whereby the adhering action of the rubber on the stud is supplemented by a mechanical interlock; and the imbedded end face of the stud is enlarged and lies parallel to face 13 and in sufficiently spaced relation to surface 15 to permit reshaping of said surface under pressure.

Any suitable clamp 19 of the radially contractible or longitudinally split type may be used to apply the plug. In the drawing I have illustrated a sectional band-type clamp in which the ends of the clamp sections are outwardly bent at 20 and reinforced by flanges 21. Bolts 22 serve to interconnect and draw together the clamp sections. Intermediate its ends, one of the clamp sections is provided with a central aperture 23.

In preparing to apply the clamp and plug to a leaking pipe, the plug 12 is placed in the interior of the apertured clamp section, with its face 13 adjacent the inner clamp surface and the pin 16 projecting through aperture 23. The plug is preferably pressed against the clamp section to establish at least partial face contact thereof with the inner face of said clamp section. Then the outer projecting end of stud 16 is bent down against the outer face of the clamp section to lock the plug to said clamp section. The bending of the stud may be accomplished readily by a few blows of a hammer. The clamp sections are then applied to the pipe with the apex of the conical surface 15 of the plug seating against the leak 11, and the clamp is tightened to firmly seat and lock the plug over the leak 11.

The prelocked relation of the plug and clamp section eliminates necessity of independent handling of the plug during the operation of effecting the seal. Thus the operator need only maintain the clamp sections, which are readily gripped and handled, in operative relation to the pipe and the leak. In this operation one man can easily apply the clamp, because a jet of fluid which will escape from a leak of the type which this clamp and plug arrangement is intended to seal will not materially hinder the handling and proper application of the clamp parts. Furthermore, the interlock of plug and clamp section is sufficiently strong to maintain the plug in desired position despite all displacing stresses applied thereto by a jet of escaping fluid, and, by proper positioning of the plug relative to the pipe leak preparatory to tightening the clamp, the force of the jet is made to press the plug more tightly against the clamp section during the interval in which the clamp is being tightened.

Tightening of the clamp serves to deform the plug to at least partially flatten the conical or tapered surface 15 thereof against the periphery of the pipe at and around the leak 11. Likewise, the face 13 of the plug is reshaped to fully conform to the periphery of adjacent clamp section.

The aperture 23 of the clamp section is formed of a size to readily receive the stud 16, but the clearance or play of said stud in said aperture is maintained at a minimum, whereby the plug cannot be displaced during the application of the clamp to the pipe, and the stresses incident to the bending of the stud will be taken at the point of interengagement of the stud with the aperture wall and not through the rubber body of the plug. The formation of the stud 16 of lead or other suitable soft metal which is readily deformed to effect an interlock with the clamp section, eliminates the necessity of providing additional means for cooperation therewith and with the clamp to obtain the interlock. Inasmuch as rubber will not adhere to and effect a grip or seal with lead, the provision of the plated layer of brass 17 constitutes simple and inexpensive means for overcoming this defect, without losing the advantage following from the soft and bendable character of the lead. An additional advantage obtaining from the use of a lead stud in this manner lies in the ease with which an old plug can be removed for replacement after it becomes ineffective for its purpose:

namely, by merely cutting off the bent projecting portion of the stud and then driving the remainder of the stud through the aperture. The natural effects of rust and corrosion on metal parts which are positioned underground for long periods are therefore of no consequence in this construction because of the character of the metals employed in the stud and the simple means of breaking the interlock.

I claim:—

1. The combination with a clamp adapted to encircle a leaking pipe, said clamp having an aperture therethrough, of a compressible plug adapted to be positioned between said pipe and clamp and to seat on said pipe at the leaking portion thereof, and a stud of deformable metal partially imbedded in said plug and projecting therefrom and through said aperture, the projecting end of said stud being pressed against the outer face of said clamp to lock said plug in operative substantially stationary relation to said clamp.

2. The combination with a clamp adapted to encircle a leaking pipe and having an aperture therethrough, of a rubber plug adapted to be compressed between said pipe and clamp and to seat on the leaking portion of said pipe, and a stud of bendable metal partially imbedded in said plug and projecting therefrom and through said clamp aperture, the projecting end of said stud being bent to lock said plug in operative substantially stationary relation to said clamp, said aperture being of a dimension slightly greater than the diameter of said stud to permit ready application of the stud therein and to sustain the stresses incident to bending said stud whereby the portion of such stresses imparted to said rubber plug is reduced to a minimum.

3. A plug adapted to be pressed against a leaking pipe, comprising a body of compressible material having a tapered surface adapted to be positioned against the pipe, and a stud of deformable metal imbedded in said body and projecting centrally from the face thereof opposite said tapered surface, the projecting end of said stud being adapted to be deformed into locked substantially stationary relation with the cooperating pressing member and the imbedded end thereof terminating in spaced relation to said tapered surface to accommodate reshaping of said surface under pressure, the material of said body firmly adhering to the portion of said stud imbedded therein.

4. A plug adapted to be pressed against a leaking pipe, comprising a body of compressible material having a configured surface adapted to be positioned against said pipe, and a stud of deformable metal having an enlarged end imbedded in said body and terminating in spaced relation to said configured surface to accommodate reshaping of said surface under pressure, the material of said body firmly adhering to the imbedded portion of said stud, the other end of said stud projecting centrally from the face of said body opposite said configured surface and adapted to be pressed into locked relation with a pressing member.

5. A plug adapted to be pressed against a leaking pipe, comprising a rubber body having a configured surface adapted to be positioned against said pipe, a lead stud having one end thereof imbedded in said rubber body and terminating in spaced relation to said configured surface to accommodate reshaping of said surface under pressure, the other end of said stud projecting centrally from the face of said body opposite said configured surface and adapted to be bent into locking relation with a pressing member, and a layer of metal to which rubber will firmly adhere applied to the surface of at least the imbedded portion of said stud.

6. A plug adapted to be pressed against a leaking pipe, comprising a circular rubber body having a tapered end surface adapted to be positioned against said pipe, a lead stud coaxial of said body having one end thereof enlarged and imbedded in said body to terminate in an enlarged end face spaced from said tapered plug end, the other end of said stud projecting from the end of said body opposite said tapered surface and adapted to be forced into locked relation with a pressing member, and a layer of metal to which rubber will firmly adhere applied to the surface of at least the imbedded portion of said stud.

PATTERSON D. MERRILL.